(12) United States Patent
Cheng et al.

(10) Patent No.: US 7,966,709 B2
(45) Date of Patent: Jun. 28, 2011

(54) COOKWARE ARTICLE WITH INTERNALLY FLUSH RIVETS

(75) Inventors: Stanley Kin Sui Cheng, Vallejo, CA (US); Mang Hung Chan, Sriracha (TH); Tanveer Khan, Srirach (TH)

(73) Assignee: Meyer Intellectual Properties Limited (VG)

( * ) Notice: Subject to any disclaimer, the term of this patent is extended or adjusted under 35 U.S.C. 154(b) by 1025 days.

(21) Appl. No.: 11/763,230

(22) Filed: Jun. 14, 2007

(65) Prior Publication Data

US 2008/0308561 A1    Dec. 18, 2008

(51) Int. Cl.
  *B23P 11/00* (2006.01)
  *B65D 25/10* (2006.01)
(52) U.S. Cl. ............... 29/525.01; 29/525.05; 29/525.06; 29/524.1; 220/768; 220/769
(58) Field of Classification Search ............... 29/525.01, 29/525.05, 525.06, 525.11, 525.13, 524.1, 29/509; 220/768, 769, 573.1, 573.2; 411/500, 411/501, 504, 506
See application file for complete search history.

(56) References Cited

U.S. PATENT DOCUMENTS

| | | | |
|---|---|---|---|
| 2,233,820 A | 3/1944 | Pavlecka | |
| 2,465,534 A | 3/1949 | Havener | |
| 3,313,022 A | 4/1967 | Leonhardt | |
| 3,747,466 A | 7/1973 | Rosman | |
| 3,747,467 A | 7/1973 | Rosman | |
| 3,824,675 A | 7/1974 | Ballantyne | |
| 3,958,389 A | 5/1976 | Whitesides et al. | |
| 4,051,592 A * | 10/1977 | Briles | 29/509 |
| 4,352,324 A | 10/1982 | Noh | |
| 4,413,767 A | 11/1983 | Hellinger et al. | |
| 4,688,316 A | 8/1987 | La Barge et al. | |
| 5,273,386 A * | 12/1993 | Luhm | 411/507 |
| 5,741,099 A | 4/1998 | Aasgaard | |
| 5,957,777 A | 9/1999 | Singh et al. | |
| 6,237,471 B1 | 5/2001 | Nam | |
| 6,527,490 B1 * | 3/2003 | Donhauser | 411/455 |
| 6,918,170 B2 | 7/2005 | Luthi | |
| 6,920,820 B2 * | 7/2005 | Meggison et al. | 99/422 |
| 2004/0247380 A1 | 12/2004 | Ross et al. | |
| 2005/0120541 A1 | 6/2005 | O'Banion et al. | |
| 2006/0185662 A1 * | 8/2006 | Kim | 126/390.1 |
| 2007/0084038 A1 | 4/2007 | Chochet | |
| 2008/0308562 A1 * | 12/2008 | Cheng et al. | 220/573.2 |
| 2009/0114662 A1 * | 5/2009 | Coyne et al. | 220/769 |

FOREIGN PATENT DOCUMENTS

| | | |
|---|---|---|
| GB | 1185196 A | 3/1970 |
| GB | 1185196 B | 3/1970 |
| JP | 2001-231695 A | 8/2001 |

* cited by examiner

*Primary Examiner* — Essama Omgba
(74) *Attorney, Agent, or Firm* — Edward S. Sherman

(57) ABSTRACT

An article of cookware is assembled by the riveted attachment of a handle. Novel rivets are first attached from the interior of the cookware article via a flush hole such that the deformation of the cookware article around the rivet locks the rivet to the cookware article yet leaves the rivet head flush with the interior surface of the cookware article. The handle is subsequently attached by deforming the opposite end of the rivet.

27 Claims, 7 Drawing Sheets

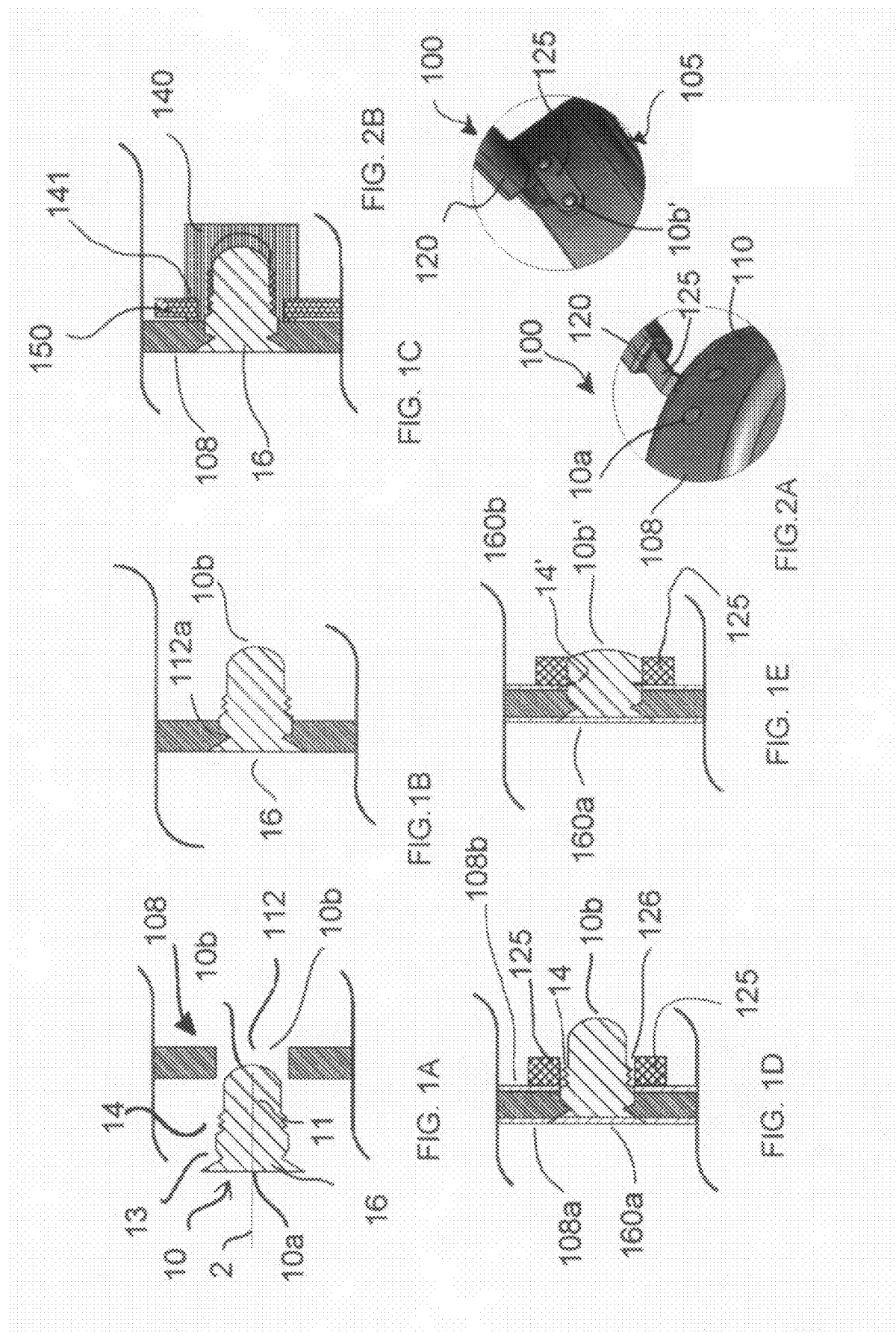

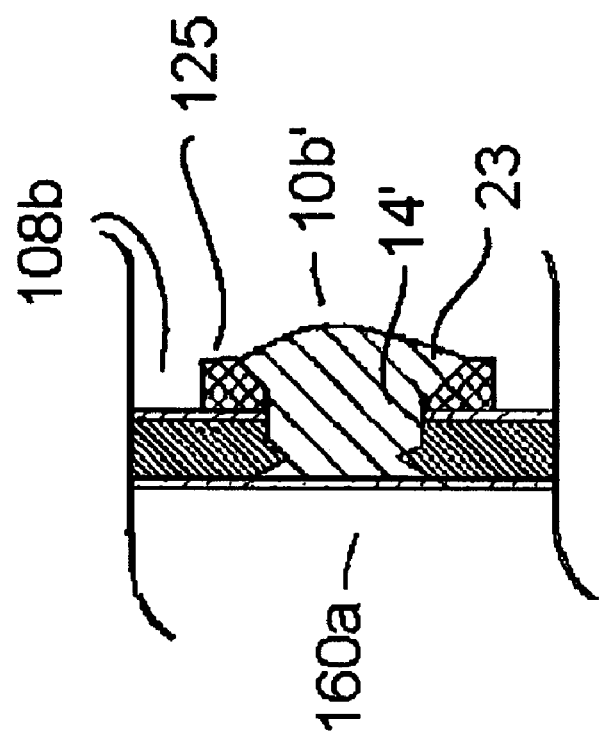
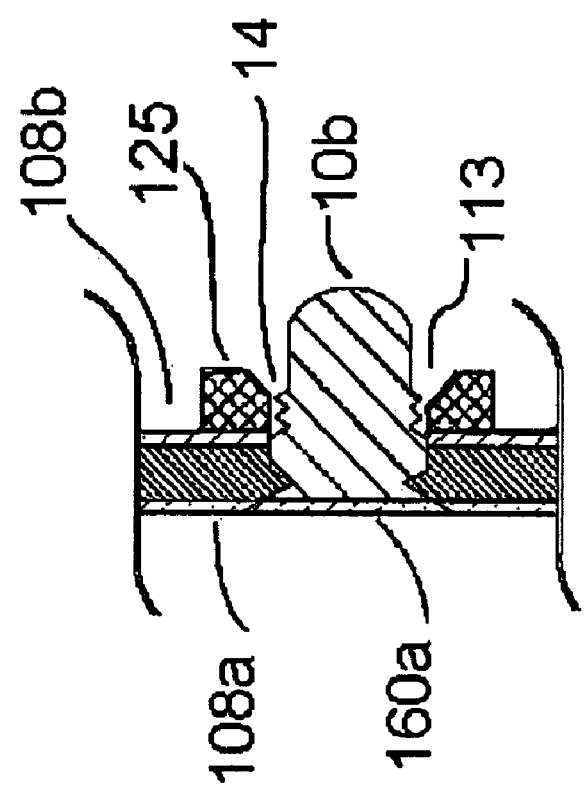
FIG. 3A
FIG. 3B

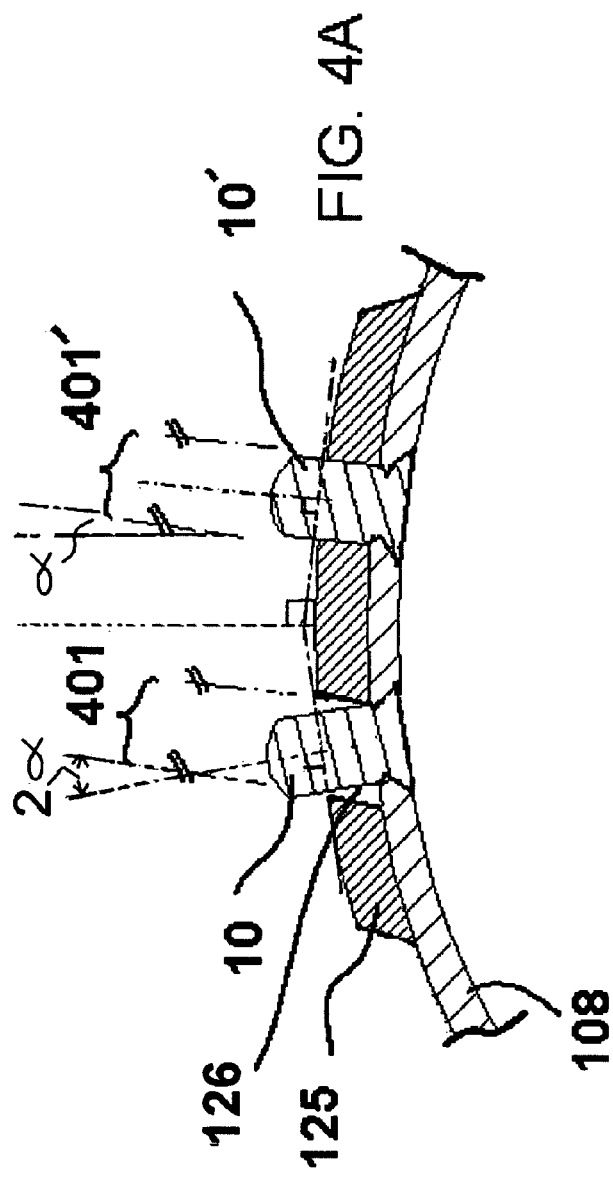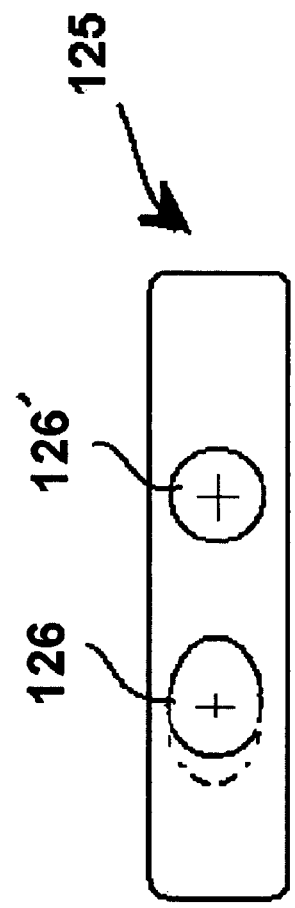

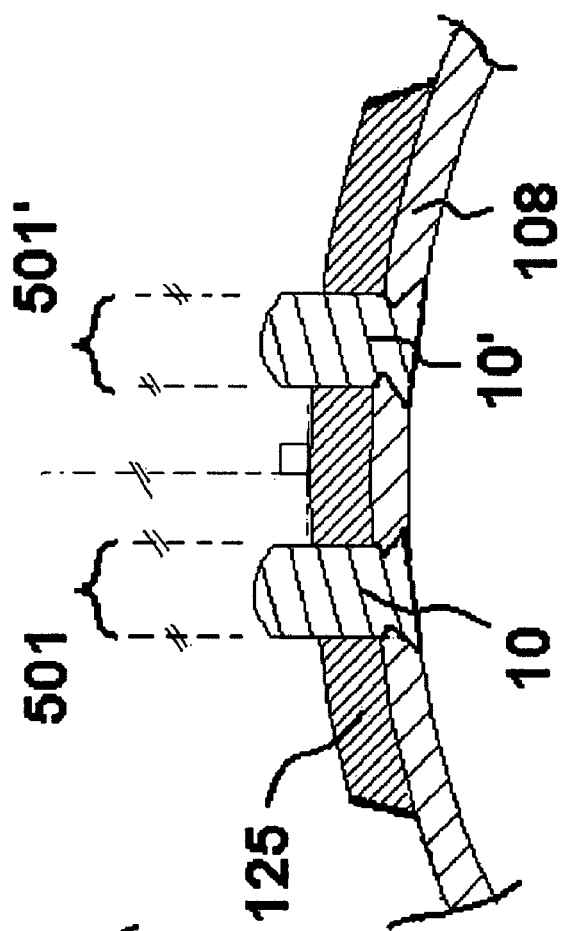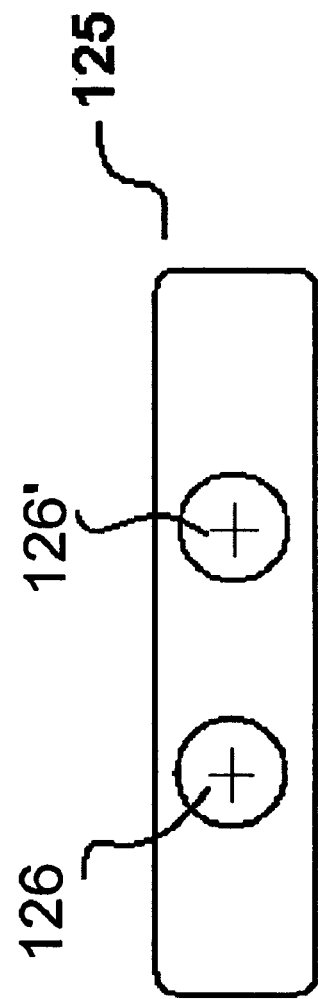

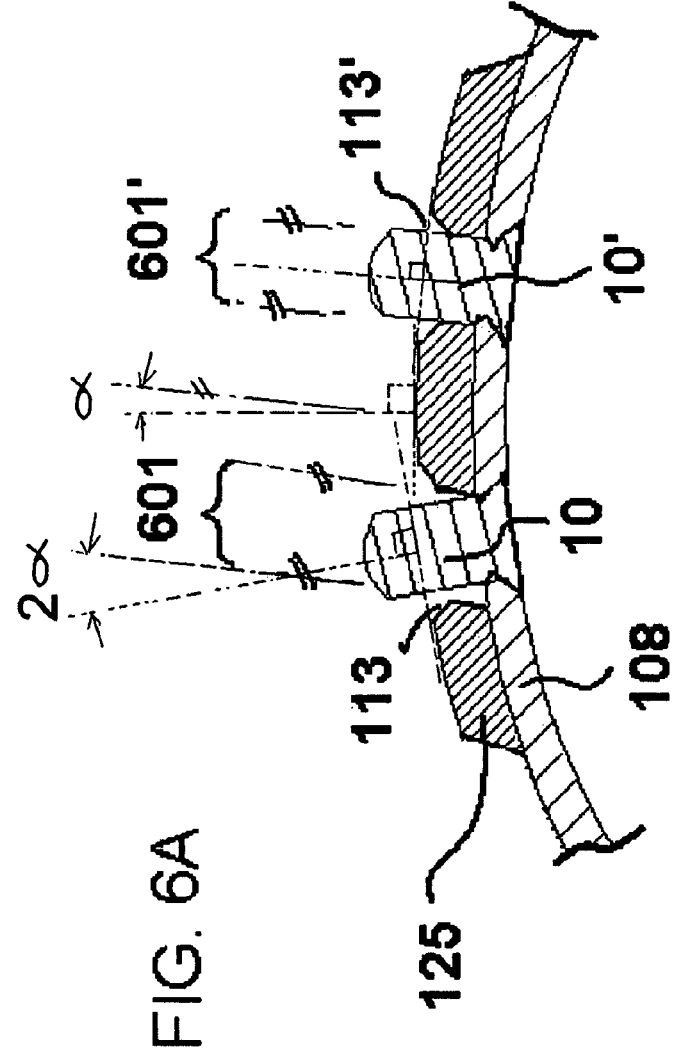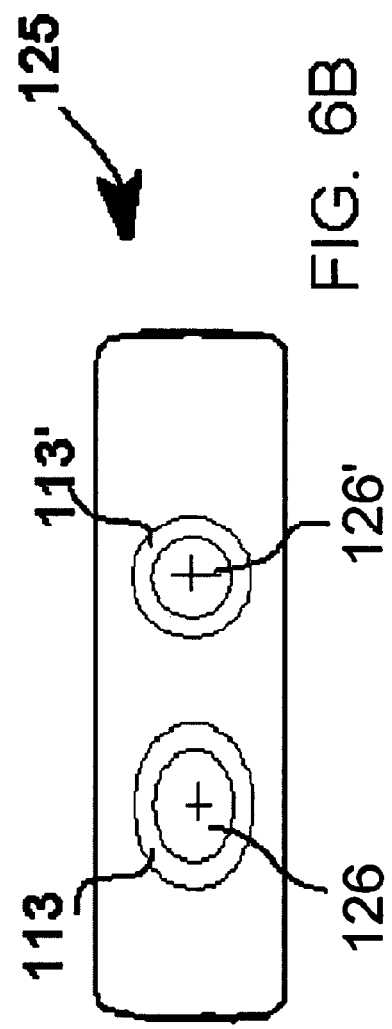

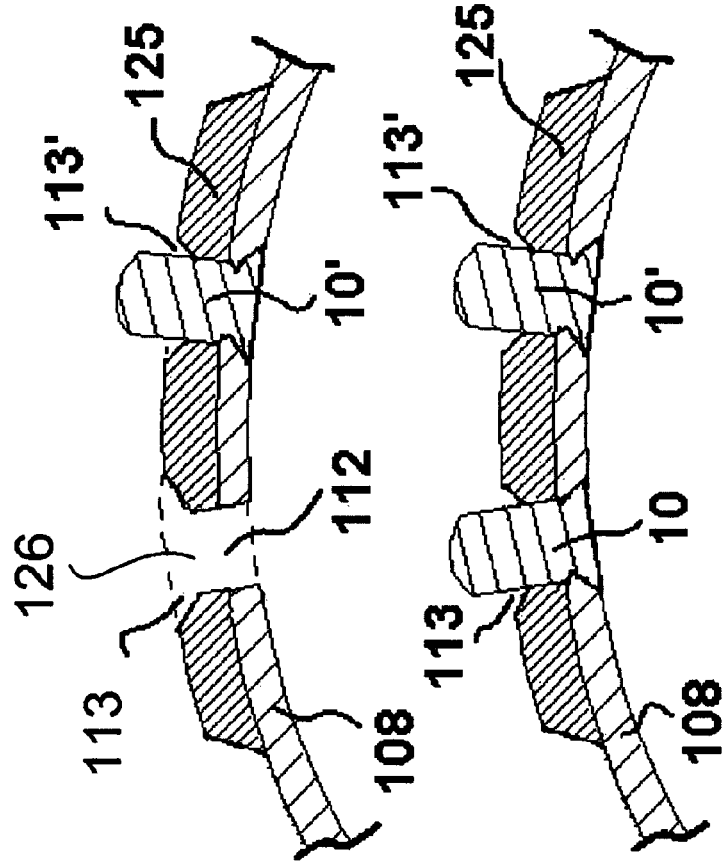

COOKWARE ARTICLE WITH INTERNALLY FLUSH RIVETS

CROSS REFERENCE TO RELATED APPLICATIONS

None

BACKGROUND OF INVENTION

The present invention relates to cookware vessels, in particular to cookware vessels having rivet attached handles.

Cookware vessels, such as pots pans and the like require handles so that they can be moved and manipulated by the cook. While such cookware vessels can be fabricated out of glass, ceramic material, and glass ceramics the preferred materials of construction for the greatest versatility are metals. Likewise it is desirable that the handle is also metallic, or at least has the principle structural component or the flange portion that is connected directly to the cooking vessel is formed of metal. While it is possible to form a cookware vessel with an integral handle by drawing and deforming a pliable metal sheet, the more common method is to first form the fluid containing cooking vessel and to then attach the handle. This allows for the handle to be constructed from a wider variety of shapes, as well as the use of multiple and different materials than the cookware vessel itself. As the handle must support the weight of the cookware vessel and the contents, which can be considerable if it is full of liquid, the bond between the handle and the cooking vessel must be strong and durable. While it is possible to weld a handle onto the outside of the cookware vessel, attachment with multiple rivets is the preferred assembly method as this process can be highly automated and produces a uniformly consistent and aesthetic appearance in each product produced. While rivets can be avoided in some instances by spot welding a handle to the side wall of a cooking vessel, it is desirable to use a multiple component handle to cover the spot weld location on the outside of the pan. Thus, frequently for light weight thin aluminum cookware a separate handle is attached by one or more screws to a flange that is spot welded to the outside of the cooking vessel wall. The handle will frequently have a canopy that extends over the sport welded flange, thus covering up the welding marks. Such screwed on handles have a less durable appearance, with the potential for the screws to loosen with abuse and poor attention to maintenance.

Although rivet connected handles are ideally suited for heavier duty cookware, in part because they convey the impression of durability to the consumer, they do have a number of drawbacks. The major drawback to rivets is that the rivet heads protrude into the interior of the cooking vessel. Though many consumers have grown accustomed to this appearance, the inward extending portion of the rivet can be more difficult to clean as for example when the inside of the cookware has a fluoropolymer non-stick coating and the rivets do not. In addition, debris can accumulate and char at the margin between the rivet and the interior cooking vessel surface, requiring extra care and more frequent attention by the consumer or professional cook in cleaning.

In another embodiment of the invention, the rivets 10 are constructed so as to be non-protruding when attached to the sidewall 108 of the cookware vessel 100. Each of such rivets 10 may be described as generally comprising a cylindrical shank portion 11, an inverted conical portion 16 and an annular notch 13 at the margin there between, as shown in FIG. 1A. The inverted conical head 16 extends outward from the annular notch 13 to the proximal end of head 10a of rivet 10. In a more preferred embodiment of the invention, the portion of shank 11 between the annular notch 13 and the distal end 10b of rivet 10 is at least partially threaded with helical screw threads 14. The purpose of the threads 14 is best understood with reference to the embodiment described with respect to FIG. 1C.

Accordingly, it is one object of the invention to provide a durable means for attaching cookware handle to the sides and lids of cookware, having the strength of rivets, yet that is aesthetically improved with at least a minimized appearance of the rivets.

It is a further object of the invention to provide cookware that is easier to clean as well as more sanitary.

SUMMARY OF INVENTION

In the present invention, the first object is achieved by providing a locking rivet that comprises a substantially cylindrical shank portion and an inverted cone portion extending outward from the shank portion having an inward extending annular notch disposed within the cylindrical shank portion and the junction with the inverted cone portion.

A second object of the invention is achieved by providing a locking rivet according to the first object that also comprises helical external threads about at least a part of the shank portion.

Another object of the invention is achieved by the method of first providing a fluid containing vessel, then forming holes in the sidewall of a fluid containing vessel and providing rivets having a tapered head and notched sides at the root of the taper and shank portion of the rivet. The shank portion of the rivets are then inserted into the holes formed in the sidewall of the fluid containing vessel from the interior of the vessel so as to deform the portion of the sidewall surrounding each hole such that it flows into the notched sides of the rivet thereby mechanically interlocking the rivet and the sidewall of the cooking vessel. Thereafter a handle that comprises a flange portion and the plurality of holes with a complementary pattern to the rivets, is inserted over the outward extending or shank portion of the rivets. Thereafter shank portion of the rivets that extend through the holes of the flange are deformed such that they flatten and expand past the margins of the holes thereby locking the handle to the cookware vessel.

The above and other objects, effects, features, and advantages of the present invention will become more apparent from the following description of the embodiments thereof taken in conjunction with the accompanying drawings.

BRIEF DESCRIPTION OF DRAWINGS

FIG. 1A is a cross-sectional elevation of a rivet prior to being inserted into the hole in the sidewall of the cooking vessel.

FIG. 1B is a cross-sectional elevation of the rivet of FIG. 1A inserted into the flush hole formed in the sidewall of the cooking vessel.

FIG. 1C is a cross-sectional elevation of the rivet showing the outward extending portion protected prior to an anodizing treatment.

FIG. 1D is a cross-sectional elevation of the rivet with the handle flange inserted thereon prior to final attachment.

FIG. 1E is a cross-sectional elevation through the rivet and handle flange after final attachment of the handle to the sidewall of the cooking vessel, FIG. 2A is a perspective view of the rivet in FIG. 1E from the inside of the cooking vessel FIG. 2B is a perspective view of the rivet of FIG. 1E from the outside or handle flange portion of the cooking vessel.

FIG. 3A is a cross-sectional elevation of the rivet in an alternative embodiment of the invention with the handle flange inserted thereon prior to final attachment.

FIG. 3B is a cross-sectional elevation through the rivet and handle flange of the embodiment in FIG. 3A after final attachment of the handle to the sidewall of the cooking vessel.

FIG. 4A is a plan cross-section view through the flange, rivets and sidewall of a partially assembled cookware vessel according to another embodiment of the invention.

FIG. 4B is an elevation of the flange section shown in FIG. 4A to illustrate a preferred configuration for the holes in the flange.

FIG. 5A is a plan cross-section view through the flange, rivets and sidewall of a partially assembled cookware vessel according to another alternative embodiment of the invention.

FIG. 5B is an elevation of the flange section shown in FIG. 5A to illustrate an alternative configuration for the holes in the flange.

FIG. 6A is a plan cross-section view through the flange, rivets and sidewall of a partially assembled cookware vessel according to an additional embodiment of the invention.

FIG. 6B is an elevation of the flange section shown in FIG. 6A to illustrate a preferred configuration for the holes in the flange.

FIGS. 7A, B and C are a series of plan cross-sections showing an alternative embodiment for assembling the handle flange with the rivets.

DETAILED DESCRIPTION

Figure 8:
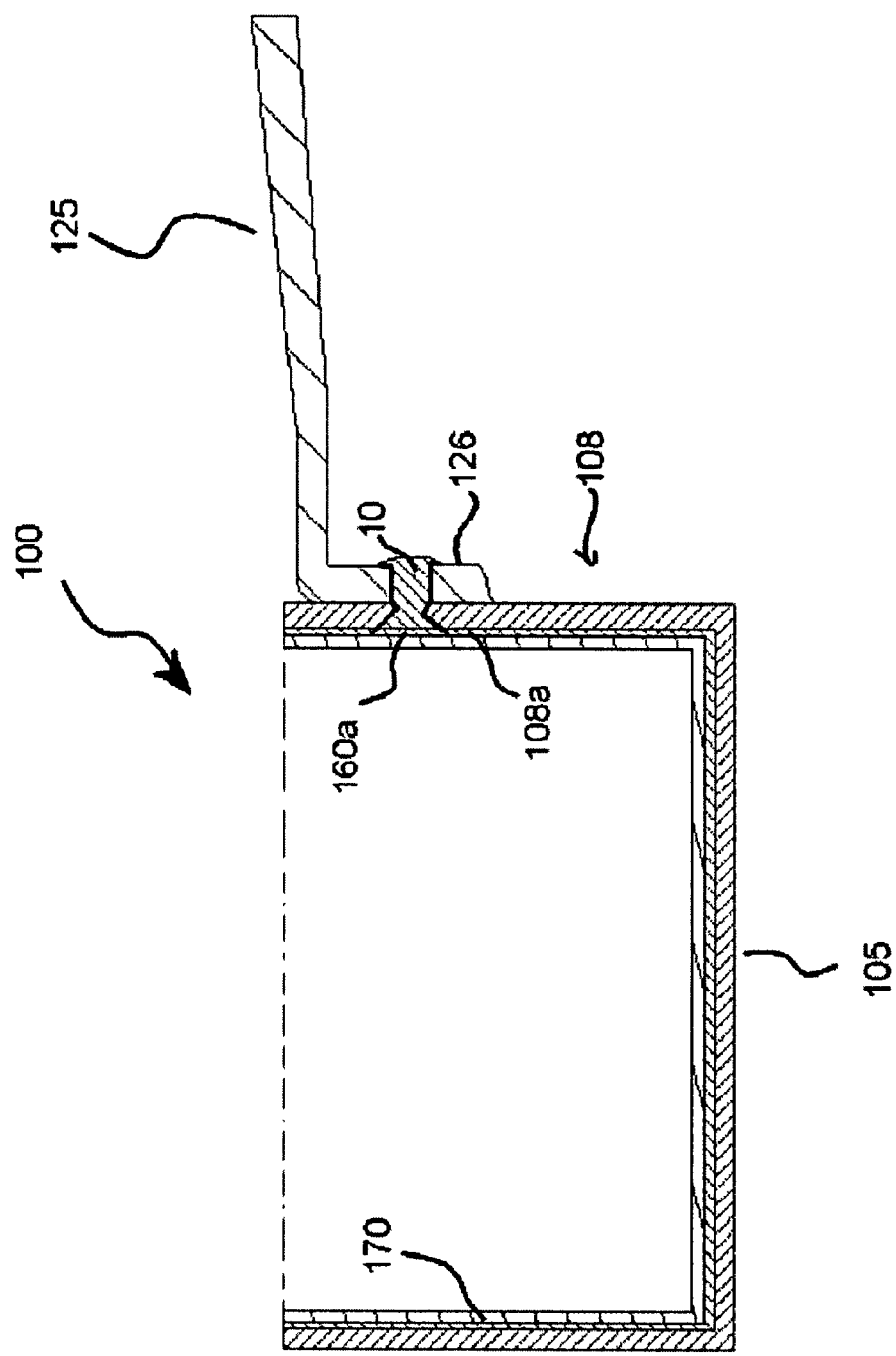
FIG. 8 is a cross sectional elevation of another embodiment of the invention.

Referring to FIGS. 1-8, wherein like reference numerals refer to like components in the various views, there is illustrated therein a new and improved cookware vessel with flush rivet system, generally denominated 100 herein.

In accordance with a first embodiment of the present invention a cookware vessel 100, of which the relevant portions are shown in FIG. 2, comprises a handle 120 with a flange portion 125 attached to sidewall 108. The cookware vessel 100 comprises a fluid containing a portion 110 having a bottom 105 and substantially upright surrounding sidewalls 108. The handle 120 is attached to the cookware vessel with non-protruding rivets 10 via flange 125. Rivets 10 penetrate through the co-aligned holes 112 and 126 that are formed in the sidewall 108 and handle flange 125 respectively. The rivets 10 do not protrude into the interior of the cookware vessel, being substantially flush with the interior sidewall 108

In another embodiment of the invention, the rivets 10 are constructed so as to be non-protruding when attached to the sidewall 108 of the cookware vessel 100. Each of such rivets 10 may be described as generally comprising a cylindrical shank portion 11, an inverted conical portion 16 and an annular notch 13 at the margin there between, as shown in FIG. 1A. The inverted conical head 16 extends outward from the annular notch 13 to the proximal end 10a of rivet 10. In a more preferred embodiment of the invention, the portion of shank 11 between the annular notch 13 and the distal end 10b rivet 10 is at least partially threaded with helical screw threads 14. The purpose of the threads 14 is best understood with reference to the embodiment described with respect to FIG. 1C.

Another embodiment of the invention is the method of inserting the rivets 10 to couple the handle flange 125 to the cookware vessel sidewall 108. This method is best understood in reference to the intermediate stages of construction shown in FIGS. 1A-E.

As shown in FIG. 1A initially cookware vessel 100 has a sidewall 108 with preferably a plurality of flush or straight sided through holes 112 for receiving a plurality of rivets 10. The rivet 10 is generally first inserted into hole 112 from the inside of the inside of cookware vessel such that side 10a faces the inner fluid containing portion.

In the step shown in FIG. 1B, rivet 10 has been inserted in flush sided hole 112 and impact bonded such that surface 10a become flush with the inner cooking surface on wall 108. When this occurs a portion 112a of the sidewall adjacent the hole 112 flows into the notch portion 13 of rivet 10, locking the rivet 10 to the sidewall 108. At this stage the handle can be attached in an additional step of inserting the rounded end 10b of the rivet into a through hole 126 in the handle flange 125. The protruding end 10b of rivet 10 is now impacted to cause it to deform around hole 126, thus locking the handle to the vessel 110 to complete the article of cookware 100. After this step it is possible to attached handle 120 via flange 125 by first using the additional step illustrated in FIG. 1D, i.e. aligning the holes 126 in flange 125 with the outward extending portion 10b of rivets 10. Then, as shown in FIG. 1E, the end of the rivet 10b is impacted with a tool to deform it to 10b', thus compressing it into hole 126 so that the handle and fluid containing portion of the cooking vessel 110 are firmly attached and coupled together.

A more preferred embodiment is shown in FIGS. 1C-1E in which rivet 10 is aluminum, as is vessel 110. In FIG. 1C a protective metal cap 140 is screwed onto the threads 14 of rivet 10 to cover end 10b. The next step in this preferred process is an anodizing treatment of the cooking vessel 110 and the inner unprotected face of rivet head 10a of rivet 10. Anodizing the face of rivet head 10a and the cooking vessel 110 has several advantages. First, the interior of the vessel has a more flush uniform appearance making the inner rivet essentially disappear so that the inside is readily cleaned after cooking. Unlike convention methods of riveting handles to cookware after anodizing treatment, by first attaching the rivet 10 to the cooking vessel 110 enable the anodizing of the rivet surface on inward facing portion of head 10a. More significantly, when a non-stick organic coating, such as a fluoropolymer coating, is applied over the interior of the cooking vessel 110, both the rivet and the cooking vessel 110 both have same anodized finish such that the fluoropolymer coating will durably adhere to the entire cooking surface. In contrast to rivets that are not anodized aluminum or added after the fluoropolymer coating, the resulting cookware article 100 will be easier to clean and maintain. It is more preferable that the cap 140 preferably has a notch 141 for attaching a titanium or other oxidation resistant metal electrode material to supply electrical current to the entire vessel 110 during the anodizing process.

Accordingly, as shown in FIG. 1D, such anodizing step with protective cap 140 in place results in an aluminum oxide or alumina coating layer 160a on the front face 10a of rivet 10 as well as the inside surface 108a and outside surface 108b of sidewalls 108. However the threads 14 and protected rear portion 10b of rivet 10 are not anodized. Thus, upon joining the flange 126 as shown in FIG. 1E, impacting the rear portion 10b of rivet 10 causes it to compress into hole 112" to secure the flange to the cooking vessel wall. It should be noted that had portion 10b become anodized, it is expected that it would be more difficult to properly compress. It should be noted that the screw flights 14' collapse and essentially disappear under flange hole 126 when the rivet end 10b is compressed.

In the alternative embodiment illustrated in FIGS. 3A and 3B, the rivet 10 has been inserted into sidewall 108 and at least the interior of the vessel 110 anodized as described with respect to FIG. 1A-C above. However, the flange 125 portion of handle 120 rather than having flush holes in the previous embodiment now has beveled or countersunk holes. Specifically, the exterior face of the flange 125 is countersunk 113 about the hole 126.

Thus, upon joining the flange 125 by impacting the rear portion 10b of rivet 10, as shown in FIG. 3B, causes it to flat or mushroom into end 10b' such that portion 23 fills the fills bevel 113 securing the flange to the cooking vessel wall.

FIG. 4-7 illustrate alternative embodiments of the invention wherein either the holes 126 in the flange 125 or the sidewall 108 are modified in various ways to facilitation mounting the flange 125 over the outward extending portion 10b of the rivets 10.

FIG. 4 is intended to illustrate a preferred configuration for the flange portion 125 of the handle 120 to facilitate attachment of the handle 120 after the rivets 10 and 10' have been inserted and attached to the wall 108 of the cookware vessel 100. As illustrated in the plan view in FIG. 4A for rivets 10 and 10', it should be understood that it is conventional for each rivet to be inserted through the sidewall 108 of the cooking vessel 100 and then into the flange 125 to be disposed with its principal access perpendicular to the tangent to the vessel surface 110 at the point of attachment. However, since it is preferred to attach both rivets 10 and 10' to the interior of the vessel before attaching the flange 125, it should be appreciated from FIG. 4A that one of holes 126 or 126' will be difficult to insert over the corresponding rivet 10 and 10' respectively.

However, first it should be appreciated that this limitation depends in large part on the curvature of the cookware vessel and the separation of the right and left rivet holes on the flange from the center of the flange. To the extent that at least one rivet can be considerably narrower than the holes in the flange and/or the flange has some flexibility these embodiments may not be necessary in all cases.

Thus, with FIG. 4A illustrating the embodiment wherein rivets 10 and 10' are not oriented parallel, but away from each other by angle +/−α (with respect to the orthogonally extending line taken at the intermediate tangent to the wall 108), at least hole 126 that receives the left rivet 10 is disposed at angle 2α from the rivets central axis so that the handle flange 125 can be inserted over both the right 10' and left 10 rivets. Thus, the right most hole 126' in flange 125 is cut parallel to line pairs 401' disposed at angle α. However, as it is preferable to assemble the flange after the attachment of the right 10' and left 10 rivets, the left hole 126 in handle flange 125 is cut so that the end 10b of rivet 10 will clear. Thus, the projection of the cut for rivet 10 is also a pair of parallel line 401, which are mutually parallel to line pair 401'. Line pair 401 is disposed at an angle of 2a with respect to the principle axis of the left rivet 10. It should be thus appreciated that because hole 126 in FIG. 4B is cut at an angle, it has an elliptical shape at the intersection with the exterior of the sidewall. This is shown in FIG. 4B wherein the left hole 126 is elliptically widened to provide sufficient clearance so that the handle 120 and flange 126 can be laterally mounted to the sidewall 108 in a single step.

FIGS. 5A and B illustrate an alternative orientation for holes 126 and 126' intended to accommodate rivets 10 and 10' respectively. Both holes, the edges of which are represented by parallel line pairs 501 and 501', are cut parallel to the surface normal to the cookware vessel wall at the position intermediate to the right 10' and left 10 rivets. Thus, rivets 10' and 10 are not disposed orthogonally with respect to the tangent at the point of attachment with the vessel sidewall 108, but rather parallel to the main or central portion of the handle 120 that extends orthogonally from the tangent to the wall taken intermediate between each of flanges holes 126 and 126'.

FIGS. 6A and B illustrates yet another alternative embodiment wherein the rivets 10 and 10' are oriented as in FIG. 4A, however each of holes 126 and 126' has bevels 113 and 113' respectively surrounding it. In this embodiment at least hole 126 that receives the left rivet 10 is disposed at angle 2α from the rivets central axis so that the handle flange 125 can be inserted over both the right 10' and left 10 rivets. Thus, the right most hole 126' in flange 125 is cut parallel to line pairs 601' disposed at angle α. However, as it is preferable to assemble the flange after the attachment of the right 10' and left 10 rivets, the left hole 126 in handle flange 125 is cut so that the end 10b of rivet 10 will clear. Thus, the projection of the cut for rivet 10 is also a pair of parallel line 601, which are mutually parallel to line pair 601'. Line pair 601 is disposed at an angle of 2α with respect to the principle axis of the left rivet 10. It should be thus appreciated that because hole 126 in FIG. 6B is cut at an angle, the surrounding bevel 113 will have an elliptical shape at the intersection with the exterior of the sidewall. This is shown in FIG. 6B wherein the left hole 126 is elliptically widened to provide sufficient clearance so that the handle 120 and flange 126 can be laterally mounted to the sidewall 108 in a single step. Further, as the left most hole 126 has a greater bevel area to be filled, it is preferable that the left most rivet is slightly longer to provide a more uniform fill and appearance between the left and right rivets.

Alternatively, the rivets 10 and 10' can be attached to the inside of the cooking vessel wall 108 after flange 125 is placed up to align holes 112 and 126. One non-limiting example of such an embodiment is illustrated in FIG. 7A-C. In the first stage, FIG. 7A, the right rivet 10' is inserted in the right hole in the vessel sidewall 108 and secured to the sidewall 108 as described with respect to the FIG. 1A-E. Next, the flange 125 of handle 120 is brought up against the exterior sidewall such that the rivet 10' is inserted in the right hole, with the left holes 112 and 126 being empty (FIG. 7A). Thereafter, as shown in FIG. 7B, the left rivet 10 is inserted through the left hole 112 in the sidewall 108 and the left hole 126 in flange 125, and impacted from the inside of the cookware vessel 110 so that the rivet 10 locks into the sidewall. With both the right 10' and left 10 rivets thus installed in the sidewall 108 and passing though the right 126' and left 126 holes in flange 125, the opposite side 10b of both rivets 10' and 10 can be impact such that they compress and fills the bevel 113' and 113 respectively, this result being shown in FIG. 7C.

FIG. 8 illustrates in cross-sectional elevation another embodiment of the invention wherein the non-stick coating layer 170 is applied over at least the interior surface 108a includes at least one rivet 10, both of which are coated with a continuous aluminum oxide or alumina layer formed by anodizing the inner cooking vessels walls at 108 and the head of the rivet 160a. Having both the interior of the cookware article and the internal face of the rivet covered with the continuous aluminum oxide coating further conceals the rivet interface, as well as improves the adhesion of the nonstick coating layer 170. Non-stick refers to a cooking surface that resists food sticking to it without the aid of oils or fats. Such coating typically include one or more layers of fluoro-polymers or fluoro-silicone polymers or other coating material with a low surface energy.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

We claim:

1. A method of forming an article of cookware,
   a) providing a vessel capable of containing fluid, the vessel having substantially upright sidewalls,
   b) forming at least one hole in a sidewall of the vessel capable of containing fluid,
   c) providing at least one rivet having a tapered head and an adjacent shank portion extending therefrom that is notched at the junction of the taper and shank portion of the rivet, the notch being an extension of the taper of the head, that extends with the outer circumference of the adjacent shank portion,
   d) inserting the shank portion of the rivet into the hole formed in the sidewall of the vessel capable of containing fluid from the interior of the vessel,
   e) deforming a portion of the vessel sidewall surrounding the hole to flow into the notched side of the rivet thereby mechanically interlocking the rivet and the sidewall of the vessel, wherein said step of deforming displaces the head of the rivet to be substantially flush with an adjacent portion of the vessel sidewall,
   f) providing a handle that comprises a flange portion and at least one hole therein,
   g) contacting the flange portion of the handle to the sidewall of the vessel whereby the shank portion of the rivet extend into the holes in the flange,
   h) deforming the shank portion of the rivet that extends through the hole of the flange such that the shank flattens and expands past the margin of the hole thereby locking the handle to the vessel.

2. A method of forming an article of cookware according to claim 1 wherein the shank portions of said at least one rivet are at least partially threaded.

3. A method of forming an article of cookware according to claim 2 wherein the vessel and said at least one rivet are substantially formed of aluminum.

4. A method of forming an article of cookware according to claim 3 further comprising the steps of;
   a) covering the threaded portion of the said at least one rivet with a nut before attaching the handle,
   b) anodizing the vessel and internally exposed head portion of said at least one rivet;
   c) removing the nut after said step of anodizing and before said step of contacting the flange portion of the handle to the sidewall of the vessel.

5. A method of forming an article of cookware according to claim 4 wherein the nut covering said at least one rivet is connected to an electrode for receiving current during said step of anodizing.

6. A method of forming an article of cookware according to claim 5 wherein the nut has a slot for receiving a spring loaded electrode.

7. A method of forming an article of cookware according to claim 4 wherein the nut is titanium.

8. A method of forming an article of cookware according to claim 4 further comprising the step of applying a nonstick coating to the interior of the vessel after said step of anodizing the interior surface of the vessel and the internally exposed portion of the heads of said at least one rivet.

9. A method of forming an article of cookware according to claim 1 wherein the flange portion of the handle has a plurality of holes for receiving a plurality of rivets and the vessel has a complementary pattern of holes wherein said at least one rivet is inserted into at least one of the complimentary holes of the vessel.

10. A method of forming an article of cookware according to claim 9 further comprising the steps of;
    a) covering the threaded portion of each rivet with a nut before attaching the handle,
    b) anodizing the cookware article and exposed portion of each rivet;
    c) removing each nut after said step of anodizing and before said step of contacting the flange portion of the handle to the sidewall of the vessel.

11. A method of forming an article of cookware according to claim 9 wherein holes for receiving rivets in the flange extend parallel to the handle.

12. A method of forming an article of cookware according to claim 1 wherein the vessel is substantially round in shape, and has a first and a second rivet hole in which the first rivet hole has a principal axis that is perpendicular to the tangent at the point of attachment with the vessel side wall and the second rivet hole has a principal axis that is parallel to the first rivet hole.

13. A method of forming an article of cookware according to claim 12 wherein two or more rivet holes in the flange is beveled.

14. A method of forming an article of cookware according to claim 12 wherein two or more rivet holes in the flange are beveled wherein said bevels are on the side of the flange facing the vessel.

15. A method of forming an article of cookware according to claim 1 wherein said at least one rivet hole in the flange is beveled.

16. A method of forming an article of cookware,
    a) providing a vessel capable of containing fluid that has a substantially upright sidewall,
    b) forming at least one hole in the sidewall of the vessel,
    c) providing at least one rivet having a head portion and a shank portion extending therefrom,
    d) inserting the shank portion of the at least one rivet into the at least one hole formed in the sidewall of the vessel from the interior of the vessel,
    e) mechanically interlocking the at least one rivet and the sidewall of the vessel, wherein the outer surface of the head portion of the at least one rivet becomes substantially flush with the interior surface of the vessels sides walls
    f) providing a handle that comprises a flange portion and at least one hole therein,
    g) contacting the flange portion of the handle to the sidewall of the vessel to insert the shank portion of the at least one rivet into the at least one hole in the flange,
    h) deforming the shank portion of the at least one rivet that extends through the holes of the flange thereby locking the handle to the vessel,
    i) covering the shank portion of said at least one rivet before attaching the handle,
    j) anodizing the vessel and the exposed portion of said at least one rivet; and
    k) uncovering the shank port of said at least one rivet after said step of anodizing and before said step of contacting the flange portion of the handle to the sidewall of the vessel.

17. A method of forming an article of cookware according to claim 16 wherein the portion of at least one of the nut and said at least one rivet that is anodized is selected from the group consisting essentially of aluminum and titanium.

18. A method of forming an article of cookware according to claim 16 wherein said at least one rivet comprises prior to said step of deforming:
   a) a substantially cylindrical shank portion,
   b) an inverted cone portion extending outward from said shank portion, and
   c) an inward extending annular notch disposed within said cylindrical shank portion and the junction with said inverted cone portion.

19. A method of forming an article of cookware according to claim 18 wherein the substantially cylindrical shank portion of said at least one rivet has at least a threaded portion.

20. A method of forming an article of cookware according claim 19 wherein the substantially cylindrical shank portion of said at least one rivet has a threaded central portion between the end thereof and the inward extending annular notch.

21. A method of forming an article of cookware according to claim 20 wherein the substantially cylindrical shank portion of said at least one rivet has a rounded circular edge.

22. A method of forming an article of cookware according to claim 16 wherein said at least one rivet is formed substantially of metal selected from the group consisting of aluminum and titanium.

23. A method of forming an article of cookware according to claim 16 wherein the method produces a resulting article of cookware having substantially concave cylindrical sidewalls which comprise:
   a) a vessel capable of containing having a bottom portion and substantially upright surrounding sidewalls,
   b) a handle attached to the substantially upright surrounding sidewalls of said vessel capable of containing, the handle having a flange portion that wraps around a least a portion of the sidewall,
   c) rivets extending through holes in the substantially upright sidewalls into corresponding holes in the adjacent flange portion of the handle, said rivets having head portions that conform with the substantially concave cylindrical sidewalls of the interior of said vessel capable of containing fluid.

24. A method of forming an article of cookware according to claim 23 wherein the rivets are aluminum and the cookware vessel is aluminum.

25. A method of forming an article of cookware according to claim 16 wherein at least one rivet has an inverted cone shaped head portion that causes an adjacent portion of the cooking vessel sidewall to deform and flow within a annular groove on the rivet disposed between the inverted cone shaped head portion and the generally cylindrical shank portion of the rivet.

26. A method of forming an article of cookware according to claim 16 wherein the flange portion of the handle has plurality of holes for receiving rivets and the vessel has a complementary pattern of holes wherein said at least one rivet is inserted into a complimentary hole of the vessel.

27. A method of forming an article of cookware according to claim 26 wherein the rivet comprises a means for causing the cooking vessel sidewall to deform and flow into a recessed portion on a part of the rivet.

\* \* \* \* \*